United States Patent
Goel et al.

(10) Patent No.: US 9,413,660 B1
(45) Date of Patent: *Aug. 9, 2016

(54) METHODS AND APPARATUS TO IMPLEMENT EXCEPT CONDITION DURING DATA PACKET CLASSIFICATION

(71) Applicant: Juniper Networks, Inc., Sunnyvale, CA (US)

(72) Inventors: Deepak Goel, Sunnyvale, CA (US); Ramesh Kumar Panwar, Pleasanton, CA (US); Srinivasan Jagannadhan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,283

(22) Filed: Jun. 23, 2014

Related U.S. Application Data

(63) Continuation of application No. 12/242,278, filed on Sep. 30, 2008, now Pat. No. 8,798,057.

(51) Int. Cl.
   *H04L 12/28* (2006.01)
   *H04L 12/741* (2013.01)

(52) U.S. Cl.
   CPC .................................. *H04L 45/745* (2013.01)

(58) Field of Classification Search
   CPC ...... H04L 47/2441; H04L 12/56; H04L 12/28
   See application file for complete search history.

(56) References Cited

U.S. PATENT DOCUMENTS

| | | | |
|---|---|---|---|
| 4,215,402 | A | 7/1980 | Mitchell et al. |
| 5,463,777 | A | 10/1995 | Bialkowski et al. |
| 5,473,607 | A | 12/1995 | Hausman et al. |
| 5,495,476 | A | 2/1996 | Kumar |
| 6,073,160 | A | 6/2000 | Grantham et al. |
| 6,157,955 | A | 12/2000 | Narad et al. |
| 6,212,184 | B1 | 4/2001 | Venkatachary et al. |
| 6,226,629 | B1 | 5/2001 | Cossock |
| 6,266,705 | B1 | 7/2001 | Ullum et al. |
| 6,457,058 | B1 | 9/2002 | Ullum et al. |
| 6,587,466 | B1 | 7/2003 | Bhattacharya et al. |
| 6,600,741 | B1 | 7/2003 | Chrin et al. |
| 6,600,744 | B1 | 7/2003 | Carr et al. |
| 6,614,789 | B1 | 9/2003 | Yazdani et al. |
| 6,618,397 | B1 | 9/2003 | Huang |

(Continued)

OTHER PUBLICATIONS

H. Jonathan Chao et al. "Matching Algorithms for Three-Stage Bufferless Clos Network Switches" IEEE Communications Magazine, Oct. 2003, pp. 46-54.

(Continued)

*Primary Examiner* — Brandon Renner
(74) *Attorney, Agent, or Firm* — Cooley LLP

(57) ABSTRACT

In one embodiment, a method includes receiving a value associated with a data packet and identifying a data set based on the value. The data set is associated with a range of values and represents routing actions. The data set is a first data set from a plurality of data sets if the value is included in the range of values associated with the first data set. The data set is a default data set if the value is not included in a range of values associated with a data set from the plurality of data sets. The method includes combining the first data set with the default data set if the first data set is identified. The method includes combining the default data set with an except data set if the default data set is identified.

20 Claims, 5 Drawing Sheets

(56) References Cited

U.S. PATENT DOCUMENTS

| | | |
|---|---|---|
| 6,654,373 B1 | 11/2003 | Maher, III et al. |
| 6,658,482 B1 | 12/2003 | Chen et al. |
| 6,665,274 B1 | 12/2003 | Yamada |
| 6,675,163 B1 | 1/2004 | Bass et al. |
| 6,704,871 B1 | 3/2004 | Kaplan et al. |
| 6,721,316 B1 | 4/2004 | Epps et al. |
| 6,731,631 B1 | 5/2004 | Chang et al. |
| 6,731,644 B1 | 5/2004 | Epps et al. |
| 6,735,670 B1 | 5/2004 | Bronstein et al. |
| 6,754,662 B1 | 6/2004 | Li |
| 6,778,532 B1 | 8/2004 | Akahane et al. |
| 6,778,546 B1 | 8/2004 | Epps et al. |
| 6,778,984 B1 | 8/2004 | Lu et al. |
| 6,789,118 B1 | 9/2004 | Rao |
| 6,813,243 B1 | 11/2004 | Epps et al. |
| 6,859,455 B1 | 2/2005 | Yazdani et al. |
| 6,862,278 B1 | 3/2005 | Chang et al. |
| 6,889,225 B2 | 5/2005 | Cheng et al. |
| 6,917,946 B2 | 7/2005 | Corl et al. |
| 6,925,085 B1 | 8/2005 | Krishna et al. |
| 6,940,862 B2 | 9/2005 | Goudreau |
| 6,947,931 B1 | 9/2005 | Bass et al. |
| 6,977,930 B1 | 12/2005 | Epps et al. |
| 7,042,878 B2 | 5/2006 | Li |
| 7,089,240 B2 | 8/2006 | Basso et al. |
| 7,133,400 B1 | 11/2006 | Henderson et al. |
| 7,136,926 B1 | 11/2006 | Iyer et al. |
| 7,173,931 B2 | 2/2007 | Chao et al. |
| 7,190,696 B1 | 3/2007 | Manur et al. |
| 7,193,997 B2 | 3/2007 | Van Lunteren et al. |
| 7,227,842 B1 | 6/2007 | Ji et al. |
| 7,233,568 B2 | 6/2007 | Goodman et al. |
| 7,233,579 B1 | 6/2007 | Crump et al. |
| 7,277,429 B2 | 10/2007 | Norman et al. |
| 7,304,992 B2 | 12/2007 | Relan |
| 7,317,723 B1 | 1/2008 | Guru |
| 7,325,074 B2 | 1/2008 | McRae |
| 7,349,415 B2 | 3/2008 | Rangarajan et al. |
| 7,356,033 B2 | 4/2008 | Basu et al. |
| 7,369,561 B2 | 5/2008 | Wybenga et al. |
| 7,373,345 B2 | 5/2008 | Carpentier et al. |
| 7,382,637 B1 | 6/2008 | Rathnavelu et al. |
| 7,382,777 B2 | 6/2008 | Irish et al. |
| 7,382,876 B2 | 6/2008 | Lauter et al. |
| 7,383,244 B2 | 6/2008 | Bass et al. |
| 7,394,809 B2 | 7/2008 | Kumar et al. |
| 7,403,524 B2 | 7/2008 | Hill |
| 7,403,526 B1 | 7/2008 | Zou et al. |
| 7,403,999 B2 | 7/2008 | Corl, Jr. et al. |
| 7,418,505 B2 | 8/2008 | Lim et al. |
| 7,424,744 B1 | 9/2008 | Wu et al. |
| 7,441,268 B2 | 10/2008 | Remedios |
| 7,480,302 B2 | 1/2009 | Choi |
| 7,525,958 B2 | 4/2009 | Kumar et al. |
| 7,543,052 B1 | 6/2009 | Cesa Klein |
| 7,602,787 B2 | 10/2009 | Cheriton |
| 7,610,330 B1 | 10/2009 | Quinn et al. |
| 7,613,209 B1 | 11/2009 | Nguyen et al. |
| 7,646,771 B2 | 1/2010 | Guru et al. |
| 7,668,160 B2 | 2/2010 | Narayan et al. |
| 7,738,454 B1 | 6/2010 | Panwar et al. |
| 7,796,541 B1 | 9/2010 | Goel et al. |
| 7,835,357 B2 | 11/2010 | Panwar et al. |
| 7,889,741 B1 | 2/2011 | Panwar et al. |
| 8,111,697 B1 | 2/2012 | Panwar et al. |
| 8,139,591 B1 | 3/2012 | Goel et al. |
| 2002/0010793 A1* | 1/2002 | Noll et al. ............ 709/240 |
| 2002/0138648 A1 | 9/2002 | Liu |
| 2002/0152209 A1 | 10/2002 | Merugu et al. |
| 2002/0191605 A1 | 12/2002 | Lunteren et al. |
| 2003/0023846 A1 | 1/2003 | Krishna et al. |
| 2003/0030575 A1 | 2/2003 | Frachtenberg et al. |
| 2003/0053460 A1 | 3/2003 | Suda et al. |
| 2003/0059045 A1 | 3/2003 | Ruehle |
| 2003/0156586 A1 | 8/2003 | Lee et al. |
| 2003/0219017 A1 | 11/2003 | Davis et al. |
| 2003/0223424 A1 | 12/2003 | Anderson et al. |
| 2003/0233516 A1 | 12/2003 | Davis et al. |
| 2004/0015599 A1 | 1/2004 | Trinh et al. |
| 2004/0028046 A1 | 2/2004 | Govindarajan et al. |
| 2004/0086117 A1 | 5/2004 | Petersen et al. |
| 2004/0095936 A1 | 5/2004 | O'Neill et al. |
| 2004/0100950 A1 | 5/2004 | Basu et al. |
| 2004/0100959 A1 | 5/2004 | Relan |
| 2004/0105422 A1 | 6/2004 | Sahni et al. |
| 2004/0190526 A1 | 9/2004 | Kumar et al. |
| 2004/0254909 A1 | 12/2004 | Testa |
| 2004/0258067 A1 | 12/2004 | Irish et al. |
| 2004/0264373 A1 | 12/2004 | Engbersen et al. |
| 2005/0083935 A1 | 4/2005 | Kounavis et al. |
| 2005/0141510 A1 | 6/2005 | Narsinh et al. |
| 2005/0146449 A1 | 7/2005 | Adl-Tabatabai et al. |
| 2005/0226235 A1 | 10/2005 | Kumar et al. |
| 2005/0232261 A1 | 10/2005 | Wybenga et al. |
| 2005/0237938 A1 | 10/2005 | Corl, Jr. et al. |
| 2006/0050690 A1 | 3/2006 | Epps et al. |
| 2006/0083247 A1 | 4/2006 | Mehta |
| 2006/0136725 A1 | 6/2006 | Walmsley |
| 2006/0195896 A1 | 8/2006 | Fulp et al. |
| 2006/0218167 A1 | 9/2006 | Bosley et al. |
| 2006/0221954 A1 | 10/2006 | Narayan et al. |
| 2006/0221956 A1 | 10/2006 | Narayan et al. |
| 2006/0221967 A1 | 10/2006 | Narayan et al. |
| 2007/0008962 A1 | 1/2007 | Basu et al. |
| 2007/0070900 A1 | 3/2007 | Heink et al. |
| 2007/0071233 A1 | 3/2007 | Zak |
| 2007/0115986 A1 | 5/2007 | Shankara |
| 2007/0133593 A1 | 6/2007 | Shankara |
| 2007/0234005 A1 | 10/2007 | Erlingsson et al. |
| 2007/0244951 A1 | 10/2007 | Gressel et al. |
| 2007/0283045 A1 | 12/2007 | Nguyen et al. |
| 2008/0052300 A1 | 2/2008 | Horgan |
| 2008/0162698 A1 | 7/2008 | Hopen et al. |
| 2008/0177812 A1 | 7/2008 | Brandle |
| 2008/0186974 A1 | 8/2008 | Singh et al. |
| 2008/0205403 A1 | 8/2008 | Akyol et al. |
| 2008/0205405 A1 | 8/2008 | Corl et al. |
| 2008/0212586 A1 | 9/2008 | Wang et al. |
| 2008/0228798 A1 | 9/2008 | Van Lunteren |
| 2008/0298582 A1 | 12/2008 | Sakai |
| 2009/0041236 A1 | 2/2009 | Gligoroski et al. |
| 2009/0196297 A1 | 8/2009 | Jabr |
| 2010/0040067 A1 | 2/2010 | Hao et al. |
| 2010/0080224 A1 | 4/2010 | Panwar et al. |
| 2010/0083345 A1 | 4/2010 | Panwar et al. |
| 2011/0200038 A1 | 8/2011 | Panwar et al. |

OTHER PUBLICATIONS

Itamar Elhanany et al. "High-performance Packet Switching Architectures" Springer Science & Business Media, ISBN-10: 184628273X, 2002, Chapter 10, 20 pages.

Office Action mailed Feb. 17, 2010 for U.S. Appl. No. 12/242,168 (12 pages).

Office Action mailed Sep. 2, 2010 for U.S. Appl. No. 12/242,168 (5 pages).

Office Action mailed May 10, 2010 for U.S. Appl. No. 12/242,143 (23 pages).

Office Action mailed Feb. 16, 2010 for U.S. Appl. No. 12/242,172 (11 pages).

Office Action mailed Apr. 23, 2010 for U.S. Appl. No. 12/347,495 (11 pages).

Final Office Action mailed Oct. 13, 2010 for U.S. Appl. No. 12/347,495 (14 pages).

U.S. Appl. No. 12/874,681, filed Sep. 2, 2010 entitled "Methods and Apparatus for Range Matching During Packet Classification Based on a Linked-Node Structure" (42 pgs).

U.S. Appl. No. 12/242,143, filed Sep. 30, 2008, entitled "Methods and Apparatus for Compression in Packet Classification" (34 pgs).

U.S. Appl. No. 12/242,125, filed Sep. 30, 2008, entitled "Methods and Apparatus for Range Matching During Packet Classification Based on a Linked-Node Structure" (39 pgs).

(56) References Cited

OTHER PUBLICATIONS

U.S. Appl. No. 12/794,175, filed Jun. 4, 2010 entitled "Methods and Apparatus Related to Packet Classification Based on Range Values" (42 pgs).

U.S. Appl. No. 12/242,158, filed Sep. 30, 2008 entitled "Methods and Apparatus for Producing a Hash Value Based on a Hash Function" (37 pgs).

U.S. Appl. No. 12/347,495, filed Dec. 31, 2008 entitled "Methods and Apparatus for Packet Classification Based on Multiple Conditions" (40 pgs).

U.S. Appl. No. 12/347,499, filed Dec. 31, 2008 entitled "Methods and Apparatus for Packet Classification Based on Multiple Conditions" (41 pgs).

U.S. Appl. No. 12/347,418, filed Dec. 31, 2008 entitled "Methods and Apparatus for Indexing Set Bit Values in a Long Vector Associated with a Switch Fabric" (35 pgs).

Office Action mailed Sep. 26, 2011 for U.S. Appl. No. 12/242,143 (37 pages).

Office Action mailed May 24, 2011 for U.S. Appl. No. 12/874,681, filed Sep. 2, 2010 (7 pages).

U.S. Appl. No. 13/097,770, filed Apr. 29, 2011, entitled "Methods and Apparatus Related to Packet Classification Associated With a Multi-Stage Switch" (33 pages).

Office Action mailed Mar. 22, 2011 for U.S. Appl. No. 12/347,495, filed Dec. 31, 2008 (11 pages).

Hugo Krawczyk "New Hash Functions for Message Authentication" L.C. Guillou and J.J. Quisquater (Eds.): Advances in Cryptology—EUROCRYPT '95, LNCS 921, pp. 301-310, 1995 © Springer-Verlag Berlin Heidelberg 1995.

Final Office Action mailed Apr. 30, 2012 for U.S. Appl. No. 12/242,143.

Office Action mailed May 7, 2012 for U.S. Appl. No. 12/242,158.

Office Action mailed Jun. 10, 2010 for U.S. Appl. No. 12/242,278 (30 pgs).

Final Office Action mailed Nov. 8, 2010 for U.S. Appl. No. 12/242,278 (33 pgs).

Office Action mailed Sep. 26, 2011 for U.S. Appl. No. 12/242,278 (35 pgs).

Final Office Action mailed Apr. 2, 2012 for U.S. Appl. No. 12/242,278 (34 pgs).

Office Action mailed Dec. 10, 2013 for U.S. Appl. No. 12/242,278 (34 pgs).

Final Office Action mailed Dec. 17, 2010 for U.S. Appl. No. 12/242,143 (29 pgs).

\* cited by examiner

METHODS AND APPARATUS TO IMPLEMENT EXCEPT CONDITION DURING DATA PACKET CLASSIFICATION

CROSS-REFERENCE TO RELATED APPLICATION

This application is a continuation of U.S. patent application Ser. No. 12/242,278, filed on Sep. 30, 2008, entitled "Methods and Apparatus to Implement Except Condition During Data Packet Classification," which is incorporated herein by reference in its entirety.

BACKGROUND

Embodiments relate generally to methods and apparatus to implement except conditions including, for example, implementing an except condition in data packet classification.

Except conditions can be used to exclude a portion of a range from the range. For example, an except condition for a range of Internet Protocol ("IP") addresses can exclude one or more IP addresses from the range. Although exception conditions can be simply stated, they are generally difficult to implement succinctly in computational hardware.

Known methods of implementing an except condition rely on a negation of a match condition. Such methods can be difficult to implement in computational hardware because the negation of a match condition can yield numerous match conditions. Additionally, the numerous match conditions produced yield an increase in computational complexity and memory requirements for storing the multiple match conditions. Thus, a need exists for improved apparatus and methods of implementing except conditions in computational hardware.

SUMMARY OF THE INVENTION

In one embodiment, a method includes receiving a value associated with a data packet and identifying a data set based on the value. The data set is associated with a range of values and represents routing actions. The data set is a first data set from a group of data sets if the value is included in the range of values associated with the first data set. The data set is a default data set if the value is not included in a range of values associated with a data set from the group of data sets. The method includes combining the first data set with the default data set if the first data set is identified. The method includes combining the default data set with an except data set if the default data set is identified.

DETAILED DESCRIPTION

Figure 1:
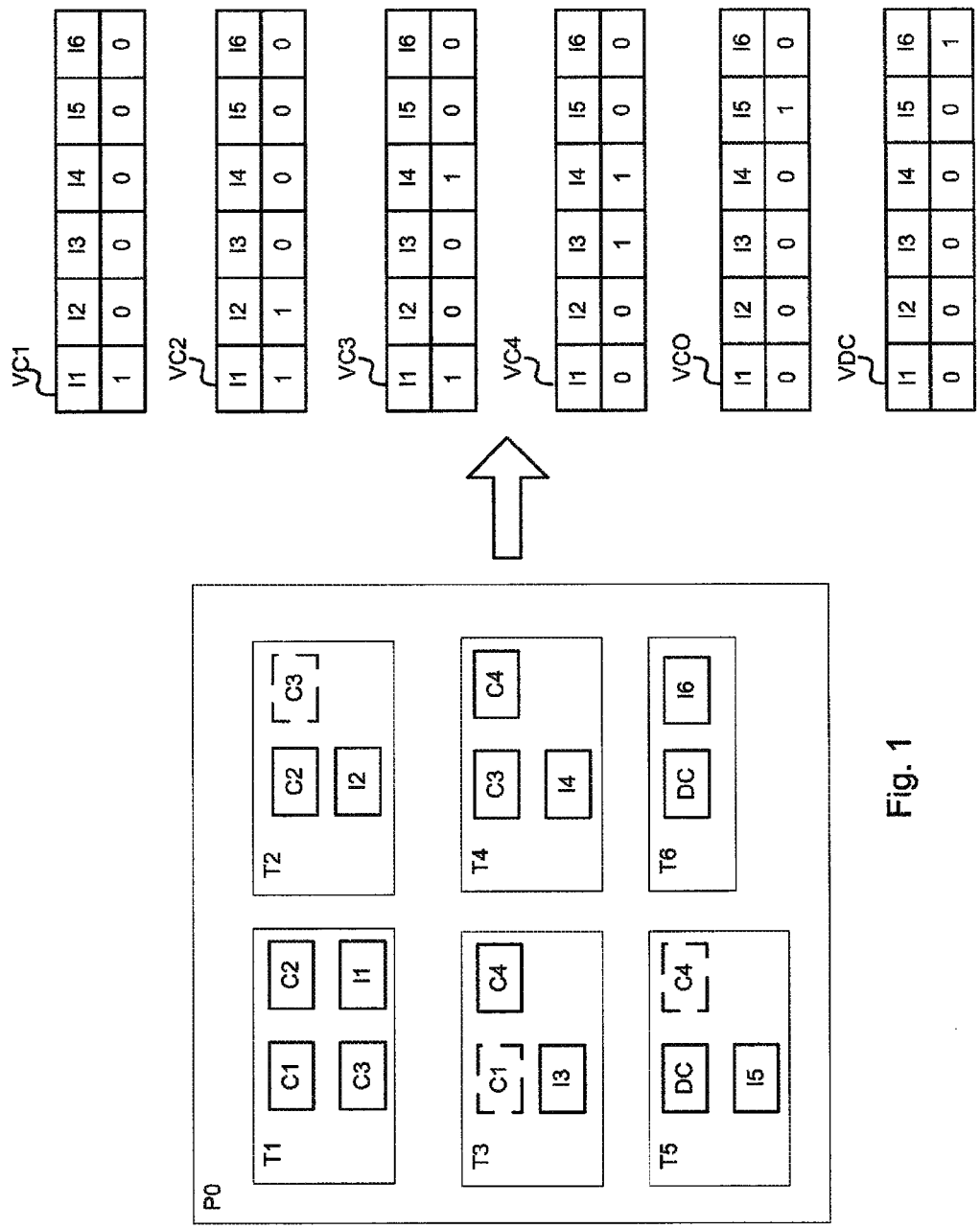
FIG. 1 is an illustration of a process for producing a policy vector configured to implement except conditions, according to an embodiment.

A packet classification module at a multi-stage switch can be configured to classify a data packet (e.g., an Internet Protocol ("IP") packet, a session control protocol packet, a media packet) received at the multi-stage switch from a network entity. Classifying can include any processing performed so that the data packet can be processed at the multi-stage switch based on a policy. In some embodiments, the policy can include one or more conditions that are associated with one or more instructions that can be executed at the multi-stage switch. For example, one or more portions (e.g., a field, a payload, an address portion, a port portion) of the data packet can be analyzed or processed by the packet classification module based on one or more conditions defined within a policy. When a condition is satisfied by, for example, a data set included in a portion of a data packet, the data packet can be processed or routed based on one or more instructions associated with the condition. In some embodiments, a portion of a data packet can be referred to as a facet.

A condition can be satisfied when a portion of a data packet matches a value specified by the condition and/or falls within a range of values specified by the condition. In other words, a condition can represent a set of values and is satisfied by any value in that set of values. For example, a condition can be a range of port values and is satisfied when a port value included in a data packet falls within the range of port values specified by the condition. In some embodiments, this type of condition can be referred to as a match condition or as a filter condition. In some embodiments, an instruction associated with a condition can be related to, for example, routing of a data packet through a switch fabric of a multi-stage switch. In some embodiments, an instruction can be associated with multiple conditions. In other words, a particular processing or routing action at a multi-stage switch can be triggered when any one of a number of conditions are satisfied.

A policy can include a condition configured as an except condition. Similar to a match condition, an except condition can be associated with an instruction and can be a single value or a range of values. When an except condition is satisfied, however, the associated instruction is not executed at a multi-stage switch. Thus, except conditions can prevent one or more values in a range of values from satisfying a condition. Said differently, an except condition can exclude a range of values from a condition. For example, a policy can include a condition that is a range of address values and an except condition that is a subset of the range of address values, each associated with a common instruction. If a data packet received by a multi-stage switch has an address value that falls within the range of address values, but not within the subset of the range of values, the condition is satisfied and the except condition is not. Thus, the instruction associated with the condition and except condition will be executed at the multi-stage switch. If the data packet, however, has an address value that falls within the range of address values and the subset of the range of address values, the condition and the except condition are satisfied, and the instruction associated with the condition and the except condition is not executed at the multi-stage switch.

As described in more detail herein, a policy can be represented by policy vectors associated with conditions from the policy. For example, a condition can be associated with a policy vector that can include one or more bit values that represent whether or not the condition—when satisfied—triggers an instruction associated with a bit value. Thus, values of elements of the policy vectors can be used to implement a policy in a multi-state switch.

In some embodiments, a policy vector can be associated with a condition that is a match condition and an except condition based on a single condition. For example, a range of values (or condition) can be included in a policy as a match condition with respect to one instruction in the policy and as an except condition with respect to another instruction in the policy. A single policy vector can represent the condition. The policy vector can have an element associated with the instruction for which the condition is a match condition, and an element associated with the instruction for which the condition is an except condition. The value of the element associated with the instruction for which the condition is a match condition can have a value configured to trigger that instruction or, said differently, cause an action based on the instruction in a multi-stage switch. The value of the element associated with the instruction for which the condition is an except condition can have a value configured to not trigger the instruction or, said differently, not cause an action based on the instruction.

Because a policy can be represented by policy vectors such as, for example, bit vectors, a hardware module can be configured to efficiently classify and route a data packet based on a determination of which bits are set (or have a value of '1') in a policy vector associated with a data packet. For example, in one embodiment, a condition can be a range of IP addresses and can be satisfied by a data packet when an IP address included in a portion of the data packet falls within the range of IP address. The condition can be associated with a policy vector including three bit values associated with data packet processing instructions: the first bit value being associated with a data packet forward instruction, the second bit value being associated with a data packet log instruction, and the third bit value being associate with a data packet discard instruction. If the first and second bit values are set and the third bit value is unset, a data packet that has an IP address that satisfies the condition (i.e., falls within the range of IP addresses of the condition) is forwarded and logged at the multi-stage switch. If the second and third bit values are set and the first bit value is unsent, a data packet that has an IP address that satisfies the condition is discarded and logged at the multi-stage switch. Thus, a policy vector can be configured to trigger instructions if a condition associated with the policy vector is satisfied by a data packet.

As discussed above, a policy vector can be associated with a condition and include bit values associated with instructions that are triggered when the condition is satisfied. FIG. 1 is a representation of a policy used in a process for producing a policy vector configured to implement except conditions, according to an embodiment. Policy P0 includes policy terms T1, T2, T3, T4, T5, and T6. Policy terms T1, T2, T3, T4, T5, and T6 include conditions and instructions. Policy term T1 includes conditions C1, C2, and C3 and instruction I1. Policy term T2 includes conditions C2 and C3 and instruction I2. Policy term T3 includes conditions C1 and C4 and instruction I3. Policy term T4 include conditions C3 and C4 and instruction I4. Policy term T5 includes default condition DC, condition C4 and instruction I5. Policy term T6 includes default condition DC and instruction I6. Condition C3 in policy term T2 is an except condition; condition C1 in policy term T3 is an except condition; and condition C4 in policy term T5 is an except condition; these except conditions are illustrated in FIG. 1 with dotted boxes.

Policy vectors VC1, VC2, VC3, and VC4 are policy vectors configured to indicate which conditions of the policy terms of policy P0 are configured to trigger which instructions of policy P0. Policy vector VC1 is associated with condition C1; policy vector VC2 is associated with condition C2; policy vector VC3 is associated with condition C3; and policy vector VC4 is associated with condition C4. In some embodiments, a policy is associated with policy vectors for each conditions in the policy terms of the policy. In some embodiments, when a condition is satisfied by, for example, a portion of a data packet received by a packet classification module, the policy vector associated with that condition is used to route (or direct) the data packet in a switch fabric. More details related to packet classification modules are set forth in co-pending patent application Ser. No. 12/242,168, filed on Sep. 30, 2008, and entitled "Methods and Apparatus Related to Packet Classification Associated with a Multi-Stage Switch," which is incorporated herein by reference in its entirety.

Each of policy vectors VC1, VC2, VC3, and VC4 has six elements. Each element is associated with one of instructions I1, I2, I3, I4, I5 and I6. For example, element one of policy vector VC1 is associated with instruction I1, element two is associated with instruction I2, element three is associated with instruction I3, element four is associated with instruction I4, element five is associated with instruction I5, and element six is associated with instruction I6. As shown in FIG. 1, policy vectors VC1, VC2, VC3, and VC4 are similarly configured. Each element of the policy vectors VC1, VC2, VC3, and VC4 is configured to have a value associated with triggering the instruction associated with the element (triggered value) of '1', and a value associated with not triggering the instruction associated with the element (untriggered value) of '0'. In some embodiments, a policy vector is a bit vector and elements are individual bits having a set value associated with triggering the instruction associated with the element, and an unset or reset value associated with not triggering the instruction associated with the element.

An element of a policy vector is assigned a triggered value if, based on a policy, the condition associated with the policy vector triggers the instruction associated with that element. In some embodiments, policies include except conditions. An element of a policy vector associated with an except condition is assigned an untriggered value if, based on the policy, the except condition prevents execution of the instruction associated with the element.

The elements of policy vectors VC1, VC2, VC3, and VC4 are assigned values to indicate which instructions will be triggered when conditions C1, C2, C3, and C4, respectively, are satisfied. Policy term T1 includes condition C1 and instruction I1. Thus, the element of VC1 associated with instruction I1 has a triggered value. The element of VC1 associated with instruction I3 has an untriggered value because C1 is an except condition in policy term T3. The remaining elements of policy vector VC1 are assigned untriggered values based on an initial value of untriggered for all elements in the policy vectors based on the policy.

Policy term T1 includes condition C2 and instruction I1. Policy term T2 includes condition C2 and instruction I2. Thus, the elements of VC2 associated with instruction I1 and instruction I2 have a triggered value. Similar to policy vector VC1, the remaining elements of policy vector VC2 are assigned untriggered values based on an initial value of untriggered for all elements in the policy vectors based on the policy.

Policy term T1 includes condition C3 and instruction I1. Policy term T4 includes condition C3 and instruction I4. Thus, the elements of VC3 associated with instruction I1 and instruction I4 have a triggered value. The element of VC3 associated with instruction I2 has an untriggered value because C3 is an except condition in policy term T2. Similar to policy vector VC1, the remaining elements of policy vector VC3 are assigned untriggered values based on an initial value of untriggered for all elements in the policy vectors based on the policy.

Policy term T3 includes condition C4 and instruction I3. Policy term T4 includes condition C4 and instruction I4. Thus, the elements of VC4 associated with instruction I3 and instruction I4 have a triggered value. The element of VC4 associated with instruction I5 has an untriggered value because C4 is an except condition in policy term T5. Similar to policy vector VC1, the remaining elements of policy vector VC4 are assigned untriggered values based on an initial value of untriggered for all elements in the policy vectors based on the policy.

Policy vector VDC is a default policy vector associated with default condition DC. For example, policy vector VDC can be associated with default condition DC that is configured to be matched or satisfied by any data packet received at a multi-stage switch. In some embodiments, a default condition can be configured to be matched or satisfied by a subset of all data packet received at a multi-stage switch such as all data packets based on a particular protocol. The elements of policy vector VDC can have values configured to trigger instructions associated with the default condition. The elements of policy vector VDC are assigned triggered values for instructions in policy terms that have only default condition DC. As shown in FIG. 1, the element I6 of policy vector VDC is set to the triggered value because policy term T6 includes only default condition DC and instruction I6. Thus, policy vector VDC indicates that instruction I6 will be triggered when default condition DC is satisfied. The remaining elements of policy vector VDC are assigned untriggered values based on an initial value of untriggered for all elements in the policy vectors based on the policy.

Policy vector VCO is an override policy vector. In some embodiments, an override policy vector can be used to determine an instruction if no condition (e.g., match condition or except condition) other than a default condition is satisfied by, for example, a portion of a data packet received by a multi-stage switch. In some embodiments, an override policy vector and a default policy vector are combined based on a logical combination such as, for example, an OR logical combination to determine one or more instructions that will be triggered is no condition other than a default condition is satisfied.

Elements of override policy vector VCO are assigned a triggered value for instructions in policy terms that have only default condition DC and an except condition as conditions. Element I5 of policy vector VCO is assigned a triggered value because policy term T5 includes conditions default condition DC and except condition C4 and instruction I5. The remaining elements of policy vector VCO are assigned untriggered values based on an initial value of untriggered for all elements in the policy vectors based on the policy.

In some embodiments, multiple policy vectors can be combined, for example, in a hardware logic module to produce a composite policy vector for the policy based on two or more policy vectors having elements set to appropriate triggered values and untriggered values. For example, a policy term in a policy has a first condition associated with a range of source address values, a second condition associated with a range of destination address values, and an instruction that is triggered if both conditions are satisfied. Thus, the policy vector associated with the first condition has an element associated with the instruction that is set to a triggered value, and the policy vector associated with the second condition has an element associated with the instruction that is set to a triggered value. These policy vectors can then be combined based on, for example, a logical AND operation to produce a composite policy vector associated with the first condition and the second condition.

In some embodiments, elements of policy vectors can be assigned values based on other assumptions or initial conditions. For example, a policy can include that a value of triggered for all elements in the policy vectors is an initial value for the policy. In some embodiments, elements of an override policy vector and/or default policy vector can be assigned values based on rules or methods other than those discussed above. For example, a policy can include more than one default condition and a default policy vector and/or an override policy vector can be associated with each default condition. Similarly, elements of an override vector can be assigned values based on other rules such as, for example, a triggered value is assigned to an element if the element is associated with an instruction in a policy term that has a default condition and at least two except conditions.

In some embodiments, a policy term is satisfied and its instruction can be executed by, for example, a multi-stage switch when any one of its conditions is satisfied. In some embodiments, a policy term is satisfied and its instruction can be executed when all of its conditions are satisfied. In some embodiments, a policy term is satisfied and its instruction can be executed when some combination such as, for example, two or more conditions are satisfied.

In some embodiments, a policy term can include more than one instruction that are executed based on satisfied conditions of the policy term. For example, a policy term can include three instructions. In some embodiment, each of the three instructions is executed if any of the conditions of the policy term are satisfied. In some embodiments, a first instruction is executed if a single condition is satisfied, a second instruction is executed if all the condition of the policy term are satisfied, and a third condition is executed if some combination of the conditions of the policy term are satisfied.

In some embodiments, some conditions of a policy term are related or apply to one portion or parameter of a data packet received by a multi-stage switch and other conditions are related or apply to another portion of a data packet. For example, a policy term can include conditions that are related to a source address value and conditions that are related to a destination port value. In some embodiments, the policy term is satisfied if the source address value of a data packet satisfies the source address value condition or if the destination port value of a data packet satisfies the destination port value condition. In some embodiments, the policy term is not satisfied unless both the source address value of a data packet satisfies the source address value condition and the destination port value of a data packet satisfies the destination port value condition.

Figure 2:
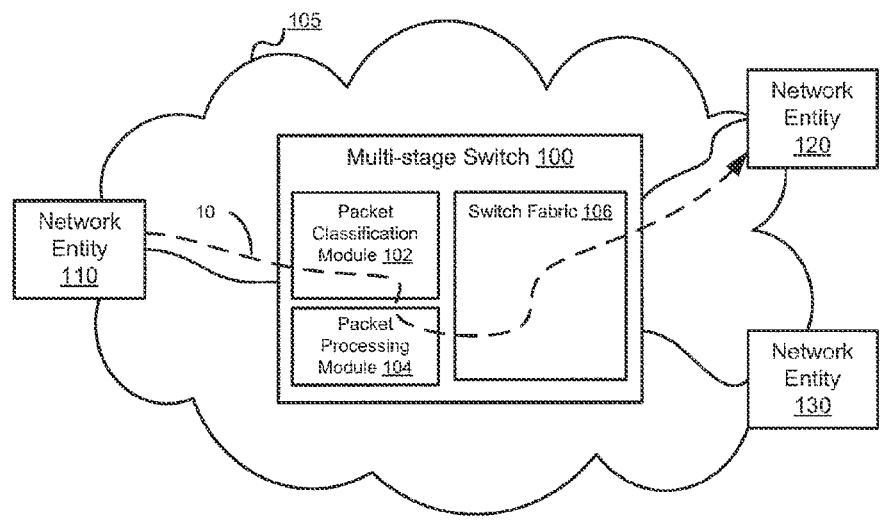
FIG. 2 is a system block diagram of a network including a multi-stage network switch, according to an embodiment.

FIG. 2 is a system block diagram of a network including a multi-stage network switch, according to an embodiment. Network entity 110, network entity 120, and network entity 130 are operatively coupled via network 105. Network 105 includes multi-stage switch 100. Multi-stage switch 100 is configured to receive data packets from network entity 110, network entity 120, and network entity 130, and to route the data packets to another network entity.

Multi-stage network switch includes packet classification module 102, packet processing module 104, and switch fabric 106. Packet classification module 102 is configured to receive a portion of a data packet received by multi-stage network 100, classify the data packet based on at least a portion of the data packet, and provide a policy vector to packet processing module 104. Packet processing module 104 is configured to receive a policy vector from packet classification module 102 and interpret one or more instructions to route the data packet through switch fabric 106 based on the policy vector.

In some embodiments, switch fabric 106 can be a switch core of a data center that has multiple stages (e.g., an ingress stage, an egress stage, a middle stage) through which data can be routed. In some embodiments, a switch core can be defined based on a Clos network architecture (e.g., a non-blocking Clos network, a strict sense non-blocking Clos network, a Benes network). In some embodiments, a network architecture such as, for example, a Clos network and/or a Benes network can be reconfigurable (e.g., rearrangeable). In some embodiments, a switch core can be defined by one or more multi-stage switches (not shown) that each include one or more switch fabrics.

For example, path 10 illustrates the path of a data packet from network entity 110 to network entity 120 through network 105. Network entity 110 sends a data packet that includes a destination address value associated with network entity 120. The data packet is received at multi-stage switch 100 and a portion of the data packet including the destination address value is passed to packet classification module 102. Packet classification module 102 receives the data packet and classifies the data packet based on the destination address value. More specifically, for example, packet classification module 102 can determine a policy vector configured to indicate one or more conditions satisfied by the destination address value based on the destination address value. Packet classification module 102 provides the policy vector to packet processing module 104. Packet processing module 104 receives the policy vector and determines one or more instructions associated with the satisfied conditions indicated in the policy vector. Packet processing module 104 provides the instructions to switch fabric 106 to route the data packet to network entity 120.

In some embodiments, packet processing module 104 can provide the instructions to a controller module (not shown) within multi-stage switch 100 operatively coupled to switch fabric 100 and configured to control the routing of data packets through switch fabric 106. In some embodiments, packet processing module 104 is configured to control the routing of data packets through switch fabric 106 directly.

Figure 3:
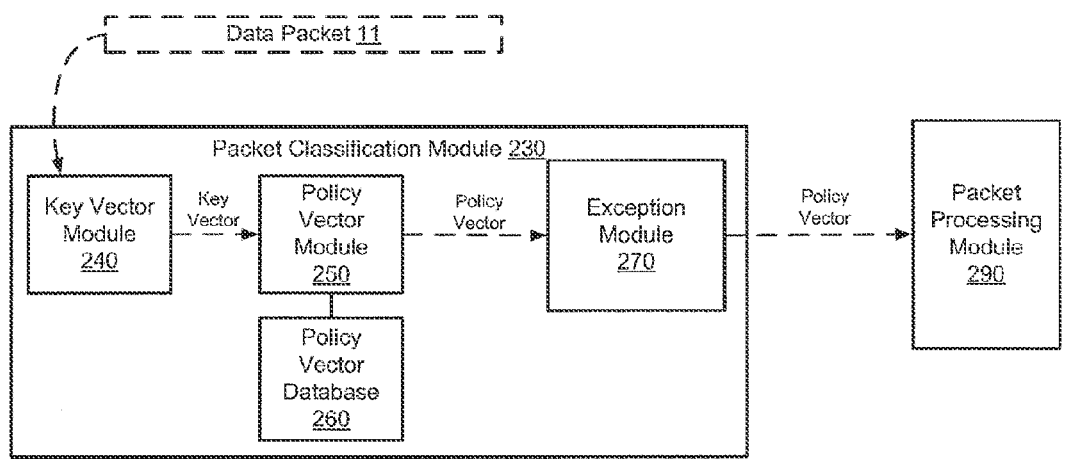
FIG. 3 is a system block diagram of a packet classification and processing system, according to an embodiment.

FIG. 3 is a system block diagram of a packet classification and processing system, according to an embodiment. As illustrated in FIG. 2, packet classification module 230 includes key vector module 240, policy vector module 250, policy vector database 260, and exception module 270. Key vector module 240 is operatively coupled to policy vector module 250, and policy vector module 250 is operatively coupled to policy vector database and exception module 270.

Key vector module 240 is configured to determine a key based on a portion of data packet 11. In some embodiments, the key can be a vector of bit elements. In some embodiments, a key can be an address value such as a destination address value or source address value in an IP data packet. In some embodiments, a key can be a port value such as a source port value or a destination port value of an IP data packet. In some embodiments, a key can be a composite of a port value and a protocol identifier. In some embodiments, a key vector module can produce two or more keys, each associated with a different portion of a data packet.

The key is provided by key vector module 240 to policy vector module 250. Policy vector module 250 produces a policy vector associated with the data packet based on the key. In some embodiments, a policy vector module can produce a policy vector associated with an address value portion of a data packet based on a hash function. More details related to hash functions in packet classification are set forth in co-pending patent application Ser. No. 12/242,154, filed on Sep. 30, 2008, and entitled "Methods and Apparatus Related to Packet Classification Based on Range Values," and in co-pending patent application Ser. No. 12/242,158, filed on Sep. 30, 2008, and entitled "Methods and Apparatus for Producing a Hash Value Based on a Hash Function," both of which are incorporated herein by reference in their entireties. In some embodiments, a policy vector module can produce a policy vector associated with a port value of a data packet based on a linked-node function. More details related to linked-node structures and functions in packet classification are set forth in co-pending patent application Ser. No. 12/242,125, filed on Sep. 30, 2008, and entitled "Methods and Apparatus for Range Matching During Packet Classification Based on a Linked-Node Structure," which is incorporated herein by reference in its entirety. In some embodiments, policy vector module 250 is configured to provide an indicator such as a signal or a default policy vector to exception module 270 to provide an indication that the policy vector associated with the data packet is a default policy vector.

In some embodiments, policy vector module 250 is operatively coupled to policy vector database 260. Policy vector database 260 can be, for example, a memory configured to store and/or provide access to a table or database of policy vectors. In some embodiments, the memory can be a solid state memory co-located on a semiconductor chip such as, for example, an application specific integrated circuit ("ASIC") or field programmable gate array ("FPGA") including circuitry and/or logic configured as key vector module 240 and/or policy vector module 250. In other embodiments, the memory can be a discrete memory element located on a common circuit board or attachable to a circuit board including circuitry and/or logic configured as key vector module 240 and/or policy vector module 250. In some embodiments, policy vector database 260 can be located remotely from policy vector module 250. For example, policy vector module 250 can include a communications interface such as a serial, parallel, or network interface for communicating with policy vector database 260.

The policy vector is received at exception module 270. Exception module 270 is configured to produce a modified policy vector configured to provide a policy vector including an except condition to packet processing module 290. In some embodiments, the except condition is integrated in the values of the elements of the policy vector. For example, a policy vector element has one value if the instructions associated with that policy vector element is associated with an except condition and the policy vector element has another value if the instructions associated with that element is associated with a condition other than an except condition. In some embodiments, exception module 270 is configured to combine two or more policy vectors to produce a composite modified policy vector such that one or more except conditions are integrated in the values of the composite modified policy vector elements. For example, a policy vector represented by a bit vector can be logically combined with an default policy vector based on, for example, a logical OR combination to produce a composite policy vector in which an element associated with an except condition has a bit value of '0'. The bit value of '0' can be an indication that a portion of a data packet satisfies an except condition and the instruction associated with the element is not triggered by the data packet.

In some embodiments, exception module 270 includes stateless (or memory-less) logic configured to logically combine policy vectors as signals representing the policy vectors propagate through exception module 270. In some embodiments, exception module 270 includes a processor or controller (not shown) configured to receive and modify or combine policy vectors.

In some embodiments, exception module 270 is configured to produce different combinations of policy vectors based on an indicator produced by policy vector module 250. For example, if policy vector module 250 produces an indication that a data packet is associated with a default condition, exception module 270 can produce a modified composite policy vector based on a default policy vector and an override policy vector in response to the indication. If policy vector module 250 provides an indication that a data packet is associated with an except condition, exception module 270 produce a modified composite policy vector based on a default policy vector and a policy vector associated with the except condition.

Exception module 270 is operatively coupled to packet processing module 290 and configured to provide policy vectors that may include one or more except conditions to packet processing module 290. As discussed above, packet processing module 290 is configured to interpret policy vectors and provide instructions such as, for example, routing instructions to a switch fabric based on a policy vector.

In some embodiments, at least two of key vector module 240, policy vector module 250, and exception module 270 are integrated as one module. In some embodiments, key vector module 240, policy vector module 250, and exception module 270 are directly operatively coupled one to another. In some embodiments, packet classification module 230 includes a processor or controller (not shown) configured to receive and/or pass (or direct) signals from at least one of key vector module 240, policy vector module 250, and exception module 270 to another of key vector module 240, policy vector module 250, and exception module 270. In some embodiments, the packet classification module includes other components such as multiplexers and/or memories.

In some embodiments, packet classification module 230 can include multiple key vector modules, policy vector modules, and/or exception modules. For example, multiple key vector modules, policy vector modules, and/or exception modules can be configured to classify a data packet based on two or more portions or facets of the data packet in parallel. In one embodiment, for example, a packet classification module can include four key vector modules, four policy vector modules, and four exception modules, where each of the key vector modules is uniquely operatively coupled to a policy vector module, and each of the policy vector module is uniquely operatively coupled to an exception module. The packet classification module can classify a packet based on, for example, four portions of a source address value, a destination address value, a source port value, and a destination port value of the data packet. In some embodiments, the classification is based on a portion of the data packet occurs substantially simultaneously with the classifications based on each of the remaining of the data packet.

In some embodiments, a policy vector provided to exception module 270 can be a compressed policy vector. A policy vectors can be compressed to increase the number of policy vector that can be stored in a policy vector database and/or increase the throughput of policy vectors from a policy vector database to a policy vector module and/or from a policy vector database to an exception module. In some embodiments, a packet classification module includes a decompression module (not shown) configured to decompress compressed policy vectors. In some embodiments, a decompression module is a discrete module within a packet classification module. In some embodiments, a decompression module can be integrated with a policy vector module and/or with an exception module. More details related to compression and decompression within a packet classification module are set forth in co-pending patent application Ser. No. 12/242,143, filed on Sep. 30, 2008, and entitled "Methods and Apparatus for Compression in Packet Classification," which is incorporated herein by reference in its entirety.

Figure 4:
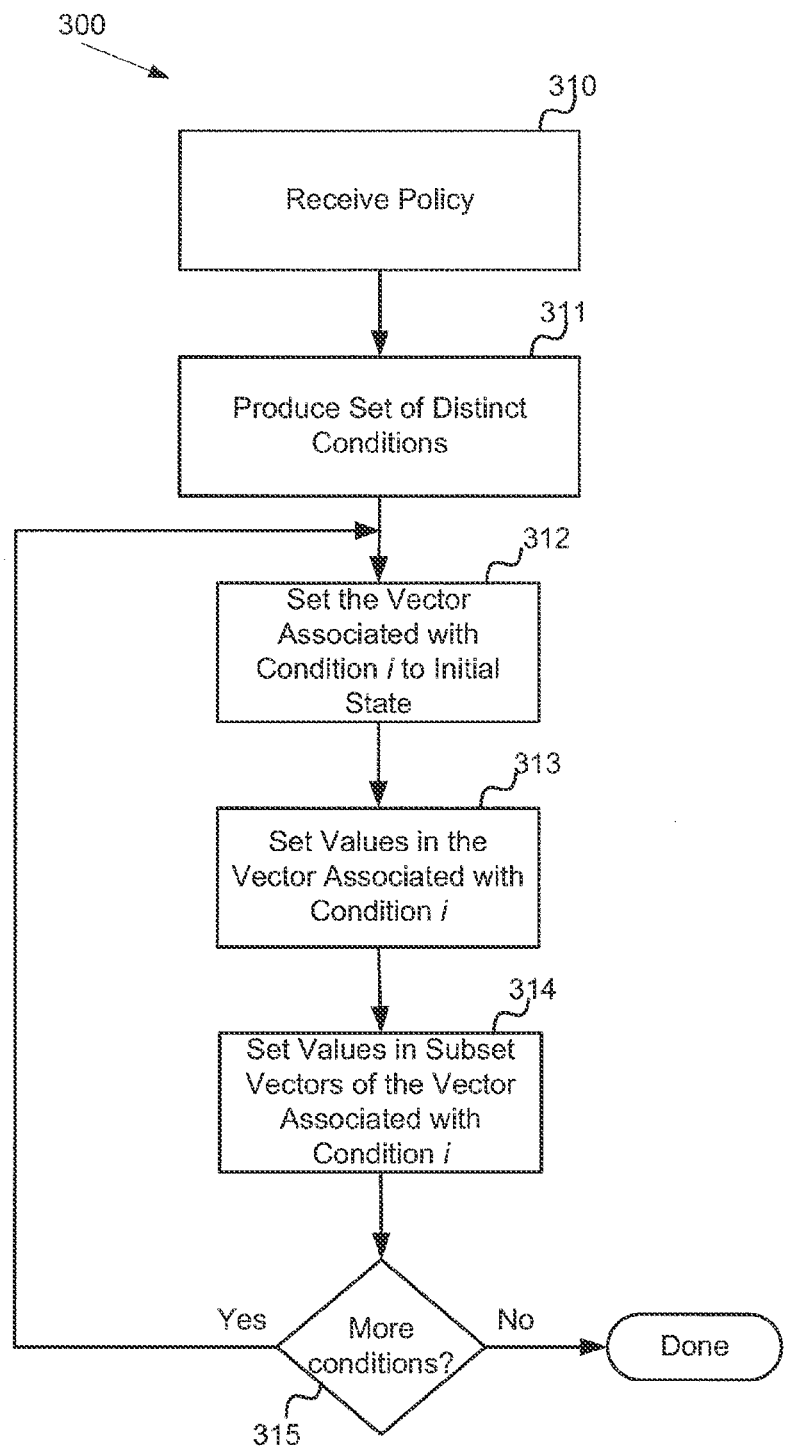
FIG. 4 is flowchart of a process for producing a policy vector configured to implement except conditions, according to an embodiment.

FIG. 4 is flowchart of a process for producing a policy vector configured to implement except conditions, according to an embodiment. A policy is received at 310. As described above, the policy can include policy terms, conditions, and/or instructions. The policy can be associated with a firewall filter, a multi-stage switch, and/or other network appliance. In some embodiments, the policy is received in the form of a text file located on a processor-readable medium by a processor configured to interpret the policy and execute the process illustrated in FIG. 3B. In some embodiments, the policy is described using a markup language or other program or script language.

The policy is processed at 311 to produce a set of distinct conditions. As discussed in relation to FIG. 1, in some embodiments, a condition can be included in more than one policy term, but only one policy vector is produced for each distinct condition. In some embodiments, the conditions are processed to remove any disjunctive overlaps. A disjunctive overlap is an overlap of two ranges whereby neither of the ranges is contained in the other. For example, one of the ranges can be separated into two ranges: one which has no overlaps with other ranges, and another which is contained in another range. More specifically, for example, the ranges [82,92] and [80,84] (from 82 through 92 and from 80 through 84, respectively) have a disjunctive overlap. The range, [80, 84] can be reformulated to be the ranges [80,81] and [82,84]. There are no disjunctive overlaps because range [80,81] does not overlap with range [82,92] or range [82,84] and range [82,84] is contained in range [82,92].

After the set of distinct conditions has been produced at 311, a policy vector is produced for each condition in the set of distinct conditions, and steps 312, 313 and 314 are repeated for each condition in the set produced at 311. At 312, the policy vector associated with the condition is set to an initial state. In some embodiments, a policy vector is a bit vector and each bit in the policy vector is reset or assigned a value of 0 as an initial state. In other embodiments, each bit in the policy vector can be set or assigned a value of 1 as an initial state. In yet other embodiments, an indeterminate state can be an initial condition. At 313, the elements of the policy vector associated with the condition are set to triggered or untriggered values based on the instructions of the policy terms in the policy. For example, policy vector elements associated with instructions in policy terms including the condition as a match condition are set to a triggered value, and policy vector elements associated with instructions including the condition as an except condition are set to untriggered values.

At 314, elements of policy vectors associated with conditions that are subsets of the condition are set to triggered or untriggered values. Because conditions can include ranges of values, one range of values can be a subset of or included in another range or condition. Accordingly, a condition of a policy term that is satisfied by a value in a range is also satisfied by a value in a subset of that range. Similarly, an except condition of a policy term that is satisfied by a value in a range is also satisfied by a value in a subset of that range. Thus, in some embodiments, elements of policy vectors associated with conditions that are subsets of other conditions are set to triggered or untriggered values based on the values of elements of policy vectors associated with the superset conditions. Furthermore, this property of ranges can result in elements of a policy vector associated with a condition that is a subset of another conditions in a set of conditions can be assigned values before or after the condition with which the policy vector is associated has been processed at 313.

For example, if the condition associated with a first policy vector is a superset of a condition associated with a second policy vector, then the element of the second policy vector associated with an instruction can be set to a triggered value if the element of the first policy vector associated with that instruction is set to a triggered value. Similarly, if the condition associated with the first policy vector is a superset of a condition associated with the second policy vector, then the element of the second policy vector associated with an instruction can be set to an untriggered value if the element of the first policy vector associated with that instruction is set to an untriggered value Because except conditions have precedence over match conditions, or the except conditions would have no meaning, values are assigned to policy vector elements such that untriggered values can replace triggered values. In some embodiments, policy vector elements can include an indication, for example, an indeterminate value to indicate whether the value of an element (or element value) is triggered, untriggered, or not yet set. The element value can be set to triggered if the element value is not yet set, but can be set to untriggered if the element value is triggered or not yet sent. In some embodiments, each condition in a set of conditions can be processed twice: the first to set elements to triggered values and the second to set elements to untriggered values. In some embodiments, the set of conditions is ordered, for example, from a broadest range to a narrowest range such that element values of policy vectors associated with subset conditions are set based on element values of policy vectors associated with superset conditions before being set based on the subset conditions.

At 315, process 300 returns to 312 if there are more conditions in the set of distinct conditions. If there are no more conditions, process 300 completes. In some embodiments, conditions can be processed in parallel.

In some embodiments, process 300 includes additional steps. For example, in some embodiments, a policy includes conditions associated with default conditions and policy vectors associated with the default conditions are produced. A default condition can be, for example, a condition satisfied by any value such as an address value or port value possible in an IP data packet. Other default conditions can be satisfied by a particular subset or range of possible values. In some embodiments, a special or default policy vector is produced that is associated with a default condition and has elements associated with the instructions of policy terms in a policy. In some embodiments, if an element associated with an instruction in a default policy vector is set to a triggered value, the elements associated with that instruction in other policy vectors based on a policy are set to an untriggered value. This can be useful, for example, to increase a compression ration of the policy vectors by causing the policy vectors to be more sparse. The default policy vector can be used in a multi-stage switch to determine an instruction for processing a data packet if no condition other than the default condition is satisfied by the data packet or a portion of the data packet.

In some embodiments, a policy vector can be associated with except conditions. In some embodiments, a policy vector associated with except conditions can be referred to as a override policy vector. In some embodiments, elements of an override policy vector associated with instructions in policy terms that include a default condition and an except condition are set to a triggered value. In some embodiments, a multi-stage switch can determine an instruction for processing a data packet based on an except policy condition if no condition other than the default condition is satisfied by the data packet or a portion of the data packet. In some embodiments, a multi-stage switch or firewall can determine an instruction for routing a data packet based on a logical combination (such as a logical OR) of a bit vector representing a default policy vector and a bit vector representing an override policy vector, if no condition other than the default condition is satisfied by the data packet or a portion of the data packet.

Figure 5:
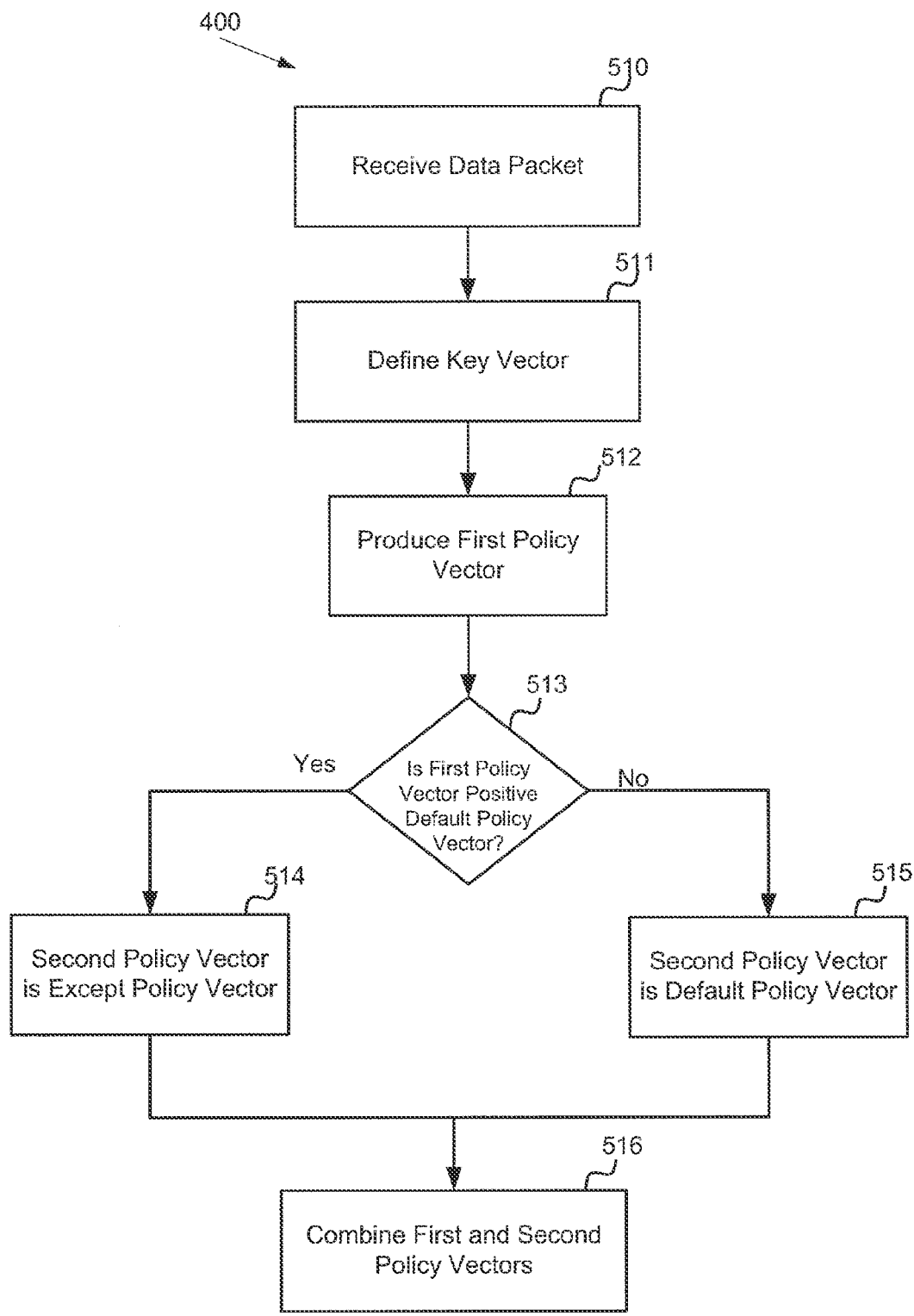
FIG. 5 is a flowchart of a process for implementing an except condition, according to an embodiment.

FIG. 5 is a flowchart of a process for implementing an except condition, according to an embodiment. A data packet is received, for example, at an ingress queue of a multi-stage switch at 510. A portion of the data packet is used to define a key at 511. Various portions of a data packet can be included or represented in a key. For example, an address value, a port value, a protocol value, a time to live ("TTL") indicator, and/or other parameters or portions of a data packet can be represented in a key. In some embodiments, multiple portions of a data packet are included in a key. In some embodiments, for example, a key includes a protocol identifier and a port value.

The key is then used to produce a first policy vector at 512 based on the key and conditions of a policy. In some embodiments, the first policy vector is produced as a result of a search of a policy vector database based on the key value. In some embodiments, the first policy vector is produced based on a hash function. In some embodiments, the first policy vector is produced based on a linked-node structure such as, for example, a binary tree structure, a four-way tree structure, or an n-way tree structure. In some embodiments, the first policy vector is a default policy vector if the key satisfies a default condition and no other conditions of a policy.

In some embodiments, an indication of the type of the first policy vector is produced. For example, in some embodiments, a bit value, flag, or indicator is set or reset if the first policy vector is a default vector. In some embodiments, the first policy vector is not produced if an indicator or flag provides an indication that only a default condition is met by a key. In some embodiments, if a first policy vector is not produced, the first policy vector can be retrieved based on an indication that the first policy vector will not be produced.

A second policy vector is retrieved or accessed based on the type of the first policy vector. If the first policy vector is a default policy vector at 513, an override policy vector is retrieved at 514. The override policy vector can be retrieved from, for example, a memory such as a register of a processor, field programmable gate array ("FPGA"), or application specific integrated circuit ("ASIC"), or from a discrete register. In other embodiments, an override policy vector can be accessed rather than retrieved. If the first policy vector is associated with a condition other than a default condition at 513, a default policy vector is retrieved at 515. In some embodiments, the default policy vector can be accessed rather than retrieved.

The first policy vector and second policy vector are combined at 516 to produce a composite policy vector. In some embodiments, the combination is a logical combination of the bits of bit vectors representing the first policy vector and the second policy vector. The logical combination of the first policy vector and the second policy vector is based on a policy. In some embodiments, a policy provides that an instruction associated with an element of the first policy vector and an element of the second policy vector be executed for a data packet if the element associated with the instruction in the first policy vector is of a triggered value or if the element associated with the instruction in the second policy vector is of a triggered value. A logical OR combination of the first and second policy vectors is appropriate for such a policy. In some embodiments, a policy provides that an instruction associated with an element of the first policy vector and an element of the second policy vector be executed for a data packet if the element associated with the instruction in the first policy vector is of a triggered value or if the element associated with the instruction in the second policy vector is of a triggered value, but that the instruction should not be executed if the element associated with the instruction in the first policy vector and the element associated with the instruction in the second policy vector are of a triggered value. A logical XOR (or, exclusive OR) combination of the first and second policy vectors is appropriate for such a policy.

Figure 6:
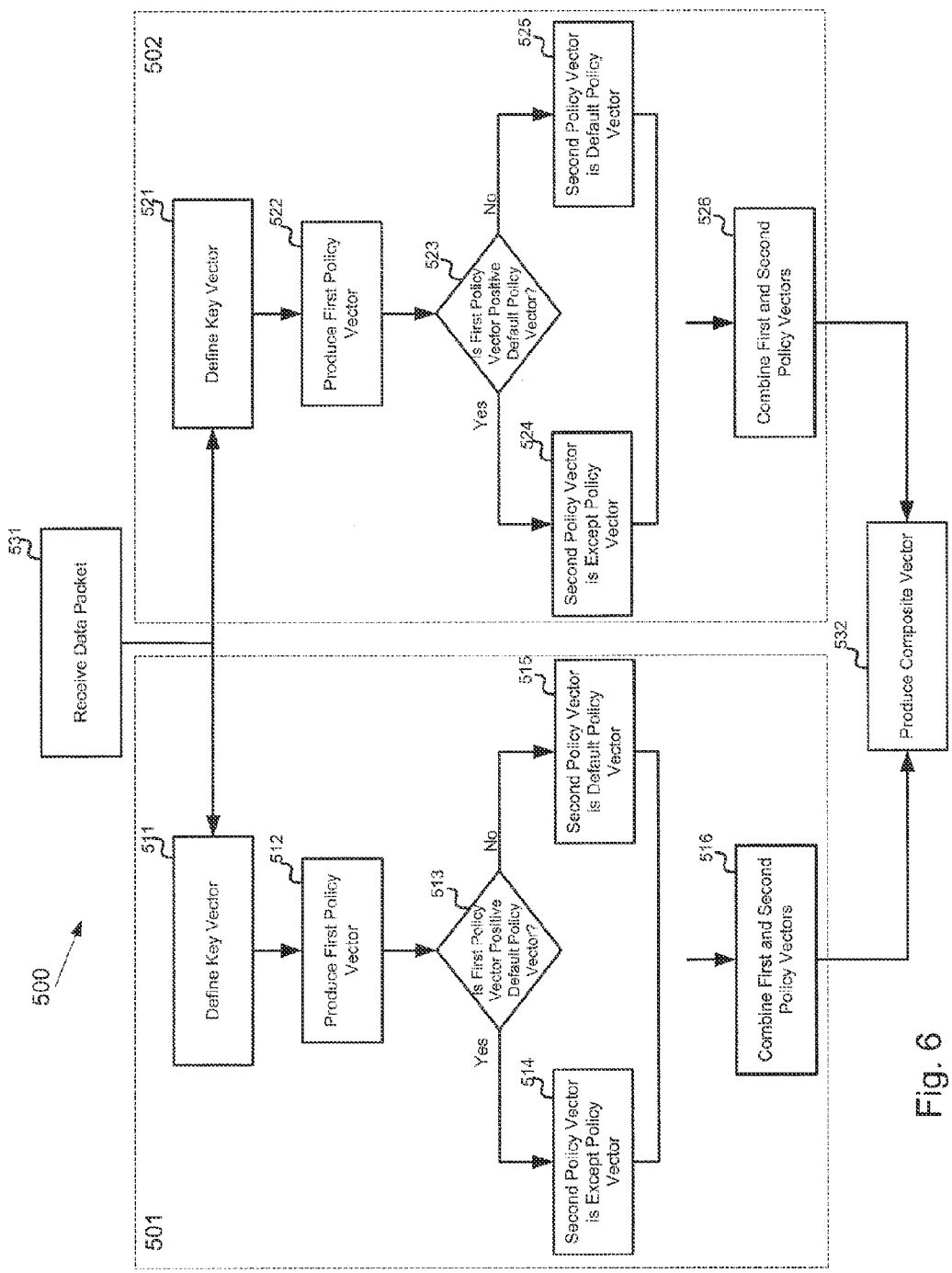
FIG. 6 is a flowchart of a process for implementing except conditions, according to another embodiment.

FIG. 6 is a flowchart of a process for implementing except conditions based on multiple portions of a data packet, according to an embodiment. Process 500 includes sub-processes 501 and 502. Sub-processes 501 and 502 are each similar to process 400 shown in FIG. 5. A data packet is received at 531 and keys are defined at 511 and 521. In some embodiments, the key defined at 511 is different from the key defined at 521. For example, the key defined at 511 can be associated with a port value of an IP data packet and the key defined at 521 can be associated with source address value of an IP data packet.

After the keys are defined at 511 and 521, each of sub-processes 501 and 502 produces a composite policy vector as described in relation to process 400. At 532, the composite policy vector produced by sub-process 501 and the composite policy vector produced by sub-process 502 are combined to produce a combined policy vector. In some embodiments, a multi-stage switch can determine which instruction from a policy to execute to route a data packet in a switch fabric based on the combined policy vector. In some embodiments, a multi-stage switch determines multiple instructions from a policy to execute based on the combined policy vector. In some embodiments, the combined policy vector is a logical combination of the composite policy vector produced by sub-process 501 and the composite policy vector produced by sub-process 502 based on a policy.

In some embodiments, the logical combination of the composite policy vector produced by sub-process 501 and the composite policy vector produced by sub-process 502 is an AND logical combination. In some embodiments, the logical combination of the composite policy vector produced by sub-process 501 and the composite policy vector produced by sub-process 502 is an XOR logical combination. In some embodiments, the logical combination of the composite policy vector produced by sub-process 501 and the composite policy vector produced by sub-process 502 is a combination of logical combination such as, for example, AND, XOR, and/or OR.

In some embodiments, a policy vector is uniquely associated with a key received by a policy vector module. For example, a key can be a representation of a source address value and a policy vector module can produce a policy vector associated with that specific source address value. In some embodiments, a policy vector is associated with a range of keys including the key received by a policy vector module. In one embodiment, for example, a key is a representation of a destination port address and a policy vector module is configured to retrieve the policy vector associated with the most specific range of destination port addresses including the destination port address represented by the key; the policy vector can be retrieved from a database of policy vectors associated with ranges of destination port values. In some embodiments, a policy vector module can produce a default policy vector based on a key. For example, a policy vector module configured to retrieve policy vectors from a database of policy vectors associated with ranges of source port values can produce a default policy vector if no policy vector in the database is associated with a range of source port values that includes the source port value.

In some embodiments, process 400 and/or process 500 can be implemented in hardware logic. For example, a packet classification module such as packet classification module 230 can be configured to execute process 400. In some embodiments, a packet classification module can include discrete logic elements such as logic gates, flip/flops, multiplexers and/or other logic configured to implement a process such as process 400 or process 500. In some embodiments, a packet classification module can include one or more FPGAs and/or ASICs.

In some embodiments, a packet classification module (including any sub-modules and/or memory) can be implemented in hardware. For example, sub-modules of the packet classification module that are configured to process the data packet based on one or more conditions associated with a policy can be implemented in hardware. In addition, sub-modules of the packet classification module that are configured to execute an instruction associated with a policy can be implemented in hardware. In some embodiments, the packet classification module (including sub-modules and memory) can be integrated on a single semiconductor chip. In some embodiments, one or more portions of the packet classification module can be implemented in software, or implemented in a combination of hardware and software.

In some embodiments, the process of classifying a data packet can be referred to as classification. In some embodiments, a portion of a multi-stage switch can be configured to trigger another portion of the multi-stage switch to execute an instruction associated with a policy. In some embodiments, a multi-stage switch can be configured to trigger, based on a policy vector, execution of an instruction at a separate entity. In some embodiments, a data packet can be processed based on a policy that is associated with a group of data packets. In some embodiments, the group of data packets can be referred to as a data packet flow or as a flow.

In some embodiments, a vector, such as the policy vector, can be a data set such as a binary string defined by, for example, a sequence of high values (represented as 1's) and/or low values (represented as 0's). The values in the binary string can be referred to as bit values. In other words, the vector can define a sequence of bit values. In some embodiments, for example, if a packet classification module is implemented in a hardware system that is a base-n system (e.g., a base-4 system), a vector processed by the packet classification module can be a base-n string. In some embodiments, the vector can be defined as a one-dimensional array. In some embodiments, for example, if a packet classification module is implemented in software, a vector processed by the packet classification module can be a string that includes a sequence of symbols (e.g., American Standard Code for Information Interchange (ASCII) characters) and/or digits. For example, the vector can be a byte string or a hexadecimal value.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, embodiments discussed in relation to processes can be implemented in ASICs, FPGAs, and/or other hardware components of a hardware-based system.

What is claimed is:

1. A method, comprising:
   receiving, via a processor, a value associated with a portion of a data packet;
   identifying, via the processor, one of a first data set or a default data set from a plurality of data sets based on the value, each data set from the plurality of data sets being associated with a range of values each associated with an instruction to trigger a routing action associated with a condition, the first data set being associated with a first range of values including the value, the default data set being associated with a default range of values each associated with an instruction to trigger a routing action associated with a default condition;
   when the first data set is identified:
      combining, via the processor, the first data set and the default data set to produce a first combined data set including a plurality of values each associated with an instruction to trigger a routing action associated with at least one of the condition or the default condition; and
      sending the first combined data set; and
   when the first data set is not identified:
      sending the default data set.

2. The method of claim 1, wherein the value is an Internet Protocol address of a network entity associated with the data packet.

3. The method of claim 1, wherein the range of values associated with each data set from the plurality of data sets is associated with a range of Internet Protocol addresses.

4. The method of claim 1, wherein the value is a port identifier of a network entity associated with the data packet.

5. The method of claim 1, wherein the condition is a first condition, the method further comprising:
   when the first data set is not identified:
      identifying, via the processor, an except data set from the plurality of data sets based on the value, the except data set being associated with an excluded range of values associated with instructions to trigger routing actions associated with a second condition;
      combining, via the processor, the default data set and the except data set to produce a second combined data set associated with instructions to trigger routing actions associated with at least one of the second condition or the default condition; and
      sending the second combined data set.

6. The method of claim 1, wherein the combining the first data set and the default data set to produce the first combined data set is based on a logical combination.

7. A non-transitory processor-readable medium storing code representing instructions to cause a processor to:
   define a key associated with a portion of a data packet received at a multi-stage switch;
   generate a first policy vector based on the key and a set of keys, the first policy vector being represented by a plurality of bit values, each bit value from the plurality of bit values associated with an instruction to trigger a routing action associated with a first condition;
   when the first policy vector does not include bit values associated with instructions to trigger routing actions associated with a default condition, generate a second policy vector associated with a set of default keys including the key, the second policy vector being represented by a plurality of bit values associated with instructions to trigger routing actions associated with the default condition; and
   produce a composite policy vector, the composite policy vector being based on a logical combination of the plurality of bit values of the first policy vector and the plurality of bit values of the second policy vector when the first policy vector does not include bit values associated with instructions to trigger routing actions associated with the default condition, and the composite policy vector being the first policy vector when the first policy vector includes at least one value associated with instructions to trigger routing actions associated with the default condition.

8. The non-transitory processor-readable medium of claim 7, wherein the key is an Internet Protocol address of a network entity associated with the data packet.

9. The non-transitory processor-readable medium of claim 7, wherein the key is a port identifier of a network entity associated with the data packet.

10. The non-transitory processor-readable medium of claim 7, wherein the first policy vector is generated as a result of a search of a policy vector database based on the key.

11. The non-transitory processor-readable medium of claim 7, wherein the first policy vector is generated based on a hash function.

12. The non-transitory processor-readable medium of claim 7, wherein the first policy vector is generated based on a linked-node structure.

13. The non-transitory processor-readable medium of claim 7, further comprising:
   generate a third policy vector when the first policy vector is a default policy vector, the third policy vector being associated with a set of exclusion keys including the key, the third policy vector being represented by a plurality of bit values associated with instructions to trigger routing actions associated with a third condition; and the composite policy vector being based on a logical combination of the plurality of bit values of the first policy vector and the plurality of bit values of the third policy vector when the first policy vector includes at least one value associated with an instruction to trigger a routing action associated with the default condition.

14. The non-transitory processor-readable medium of claim 7, wherein the key is associated with multiple portions of the data packet.

15. An apparatus, comprising:
a memory configured to store a policy vector database including a plurality of policy vectors, each policy vector from the plurality of policy vectors being represented by a plurality of bit values associated with instructions to trigger routing actions associated with a condition in a multi-stage switch; and
a processor operatively coupled to the memory,
the processor configured to define a key associated with a portion of a data packet received at the multi-stage switch;
the processor configured to generate a first policy vector based on the key and a set of keys,
the processor configured to generate a second policy vector when the first policy vector does not include bit values associated with instructions to trigger routing actions associated with a default condition, the second policy vector being associated with a set of default keys including the key, and
the processor configured to produce a composite policy vector, the composite policy vector being based on a logical combination of the plurality of bit values of the first policy vector and the plurality of bit values of the second policy vector when the first policy vector does not include bit values associated with instructions to trigger routing actions associated with the default condition, and the composite policy vector being the first policy vector when the first policy vector includes at least one bit value associated with an instruction to trigger a routing action from the instructions to trigger routing actions associated with the default condition.

16. The apparatus of claim 15, wherein the key is an Internet Protocol address of a network entity associated with the data packet.

17. The apparatus of claim 15, wherein the key is a port identifier of a network entity associated with the data packet.

18. The apparatus of claim 15, wherein the first policy vector is generated as a result of a search of a policy vector database based on the key.

19. The apparatus of claim 15, wherein the first policy vector is generated based on a hash function.

20. The apparatus of claim 15, wherein the first policy vector is generated based on a linked-node structure.

* * * * *